(12) United States Patent
Liu et al.

(10) Patent No.: US 11,783,588 B2
(45) Date of Patent: Oct. 10, 2023

(54) METHOD FOR ACQUIRING TRAFFIC STATE, RELEVANT APPARATUS, ROADSIDE DEVICE AND CLOUD CONTROL PLATFORM

(71) Applicant: Apollo Intelligent Connectivity (Beijing) Technology Co., Ltd., Beijing (CN)

(72) Inventors: Bo Liu, Beijing (CN); Xing Hu, Beijing (CN); Jialin Yang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 140 days.

(21) Appl. No.: 17/506,524

(22) Filed: Oct. 20, 2021

(65) Prior Publication Data
US 2022/0165064 A1 May 26, 2022

(30) Foreign Application Priority Data
Mar. 18, 2021 (CN) .......................... 202110288819.2

(51) Int. Cl.
*G06T 7/20* (2017.01)
*G06V 20/54* (2022.01)

(52) U.S. Cl.
CPC ................ *G06V 20/54* (2022.01); *G06T 7/20* (2013.01); *G06T 2207/30232* (2013.01); *G06T 2207/30236* (2013.01)

(58) Field of Classification Search
CPC ...... G06V 20/54; G06V 20/584; G06V 20/52; G06T 7/20; G06T 2207/30232;
(Continued)

(56) References Cited

U.S. PATENT DOCUMENTS

2017/0327035 A1    11/2017  Keiser
2018/0211526 A1*    7/2018  Gallagher ................ G08G 1/04

FOREIGN PATENT DOCUMENTS

CN    110751683 A    2/2020
CN    110807924 A    2/2020
(Continued)

OTHER PUBLICATIONS

Extended European Search Report for Application No. 21203850.9, dated Feb. 28, 2022 (8 pages).
(Continued)

*Primary Examiner* — Stephen P Coleman
(74) *Attorney, Agent, or Firm* — Ice Miller LLP

(57) ABSTRACT

A method for acquiring a traffic state, an electronic device, a computer-readable storage medium, a roadside device and a cloud control platform are provided. An implementation of the method may include: acquiring monitoring data from at least one camera in a camera group, wherein the at least one camera is capable of shooting object moving states at different road sections or a same road section of a target intersection; determining, based on the monitoring data acquired from each camera in the at least one camera, a moving trajectory of a reference object recorded by the each camera in the at least one camera; then fusing moving trajectories of the reference object to obtain a completed trajectory; and finally predicting an indication state of a signal light on a corresponding road based on a travel direction of the corresponding road, the completed trajectory being located on the corresponding road.

20 Claims, 6 Drawing Sheets

(58) Field of Classification Search
CPC ........... G06T 2207/30236; G06T 7/292; G06T 2207/10016; G06T 2207/30241; G06T 2207/30252; G06T 7/246; G06T 2207/10004; G08G 1/0133; G08G 1/056; G08G 1/065; G08G 1/095; G08G 1/0116
USPC ...................................................... 382/103
See application file for complete search history.

(56) References Cited

FOREIGN PATENT DOCUMENTS

| CN | 111081045 A | 4/2020 |
| CN | 111489555 A | 8/2020 |
| CN | 111681433 A | 9/2020 |
| CN | 111858800 A | 10/2020 |
| JP | 2016014939 A | 1/2016 |
| JP | 2016206756 A | 12/2016 |
| JP | 2020038486 A | 3/2020 |
| WO | WO 2020/191642 A1 | 10/2020 |
| WO | WO 2021/008039 A1 | 2/2021 |

OTHER PUBLICATIONS

Wang J. et al.; "Research on Judgement Method of Urban Road Traffic Station Based on Video Image"; Science and Technology Innovation Herald, No. 36, pp. 147-149, 151; English abstract only; 2017; DOI: 10.16660/j.cnki.1674-098X.2017.36.147 (5 pages).

* cited by examiner

METHOD FOR ACQUIRING TRAFFIC STATE, RELEVANT APPARATUS, ROADSIDE DEVICE AND CLOUD CONTROL PLATFORM

CROSS-REFERENCE TO RELATED APPLICATIONS

This application claims priority to Chinese Patent Application No. 202110288819.2, filed with the China National Intellectual Property Administration (CNIPA) on Mar. 18, 2021, the content of which is incorporated herein by reference in its entirety.

TECHNICAL FIELD

The present disclosure relates to the field of computer technology, particularly to the technical fields of artificial intelligence, such as computer vision, deep learning and intelligent transportation, and more particularly to a method and apparatus for acquiring a traffic state, an electronic device, a computer-readable storage medium, a computer program product, a roadside device and a cloud control platform.

BACKGROUND

With the development of human science and technology, the demands for technical construction in the field of urban intelligent transportation are increasing. In order to reduce the traffic inefficiency problems caused by unreasonable traffic route planning and unscientific speed distribution, it is necessary to obtain the traffic states at intersections based on indication states of signal lights at the intersections, so that more scientific traffic planning can be carried out based on the traffic states.

In the conventional technology, in order to know display states of the traffic signal lights installed at the traffic intersections, images including the display states of the traffic signal lights are required to be acquired from image acquisition devices, such as road condition monitoring cameras and roadside sensing cameras, and then the display states of the traffic signal lights in the images are analyzed by inference models.

SUMMARY

Embodiments of the present disclosure provide a method and apparatus for acquiring a traffic state, an electronic device, a computer-readable storage medium, a computer program product, a roadside device and a cloud control platform.

In a first aspect, embodiments of the present disclosure provide a method for acquiring a traffic state, and the method includes: acquiring monitoring data from at least one camera in a camera group, where the at least one camera is capable of shooting object moving states at different road sections or a same road section of a target intersection; determining, based on the monitoring data acquired from the at least one camera, a moving trajectory of a reference object recorded by each camera in the at least one camera; fusing moving trajectories of the reference object to obtain a completed trajectory; and predicting an indication state of a signal light on a corresponding road based on a travel direction of the corresponding road, the completed trajectory being located on the corresponding road.

In a second aspect, embodiments of the present disclosure provide an apparatus for acquiring a traffic state, and the apparatus includes: a monitoring data acquisition unit configured to acquire monitoring data from at least one camera in a camera group, wherein the at least one camera is capable of shooting object moving states at different road sections or a same road section of a target intersection; a moving trajectory determination unit configured to determine, based on the monitoring data acquired from the at least one camera, a moving trajectory of a reference object recorded by each camera in the at least one camera; a completed trajectory generation unit configured to fuse moving trajectories of the reference object to obtain a completed trajectory; and an indication state prediction unit configured to predict an indication state of a signal light on a corresponding road based on a travel direction of the corresponding road, the completed trajectory being located on the corresponding road.

In a third aspect, embodiments of the present disclosure provide an electronic device, including: at least one processor; and a memory communicatively connected to the at least one processor, where the memory stores instructions executable by the at least one processor, and the instructions, when executed by the at least one processor, cause the at least one processor to implement the method for acquiring a traffic state as described in any of the implementations of the first aspect.

In a fourth aspect, embodiments of the present disclosure provide a non-transitory computer-readable storage medium storing computer instructions, where the computer instructions are used to cause a processor to implement the method for acquiring a traffic state as described in any of the implementations of the first aspect.

In a fifth aspect, embodiments of the present disclosure provide a computer program product including a computer program, where the computer program, when executed by a processor, cause the processor to implement the method for acquiring a traffic state as described in any of the implementations of the first aspect.

In a sixth aspect, embodiments of the present disclosure provide a roadside device including the electronic device as described in the third aspect.

In a seventh aspect, embodiments of the present disclosure provide a cloud control platform including the electronic device as described in the third aspect.

According to the method and apparatus for acquiring a traffic state, the electronic device, the computer-readable storage medium, the computer program product, the roadside device and the cloud control platform provided by embodiments of the present disclosure, the monitoring data is acquired from the at least one camera of the camera group, where the at least one camera is capable of shooting the object moving states of the different road sections or the same road section at the target intersection; the moving trajectory of the reference object recorded by each camera in the at least one camera is determined based on the monitoring data acquired from each camera; then, the moving trajectories of the given reference object are fused to obtain the completed trajectory; and finally, the indication state of the signal light on the corresponding road is predicted based on the travel direction of the corresponding road on which the completed trajectory is located.

It should be appreciated that the contents described in this section are not intended to identify the key or critical features of embodiments of the present disclosure, nor is it intended to limit the scope of the present disclosure. The other features of the present disclosure will become easy to understand through the following description.

BRIEF DESCRIPTION OF THE DRAWINGS

By reading the detailed description of non-limiting embodiments with reference to the following accompanying drawings, other features, objects and advantages of the present disclosure will become more apparent.

FIGS. 4-1, 4-2, 4-3, 4-4 and 4-5 are the schematic effect diagrams of an application scenario of the method for acquiring a traffic state according to embodiments of the present disclosure, and in the application scenario cameras determine motion trajectories and a completed trajectory of a reference object;

FIG. 5 is a structural block diagram of an apparatus for acquiring a traffic state according to embodiments of the present disclosure.

DETAILED DESCRIPTION OF EMBODIMENTS

Example embodiments of the present disclosure are described below in combination with the accompanying drawings, where various details of embodiments of the present disclosure are included to facilitate understanding and should be considered as examples only. Therefore, those of ordinary skill in the art should realize that various changes and modifications may be made to the embodiments described herein without departing from the scope and spirit of the present disclosure. Similarly, for clarity and conciseness, descriptions of well-know functions and structures are omitted in the following description. It should be noted that the embodiments in the present disclosure and the features in the embodiments may be combined with each other on a non-conflict basis.

Figure 1:
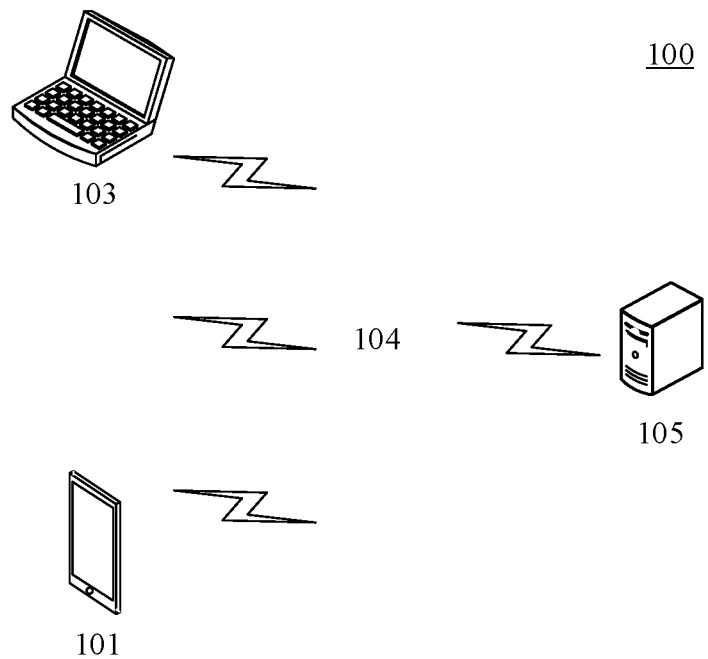
FIG. 1 is an example system architecture to which the present disclosure may be applied.

FIG. 1 shows an example system architecture 100 to which embodiments of a method and apparatus for acquiring a traffic state, an electronic device and a computer-readable storage medium of the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

A user may use the terminal devices 101, 102, 103 to interact with the server 105 through the network 104 to receive or send messages, and the like. Various applications for implementing information communication between the terminal devices 101, 102, 103 and the server 105, such as traffic navigation applications, image analysis applications and instant messaging applications, may be installed on the terminal devices 101, 102, 103 and the server 105.

The terminal devices 101, 102, 103 and the server 105 may be hardware or software. When the terminal devices 101, 102, 103 are hardware, the terminal devices 101, 102, 103 may be various electronic devices having a display screen, including but not limited to, a smart phone, a tablet computer, a laptop portable computer and a desktop computer; and when the terminal devices 101, 102, 103 are software, the terminal devices 101, 102, 103 may be installed in the electronic devices, and may be implemented as multiple software pieces or software modules, or as a single software piece or software module, which is not specifically limited herein. When the server 105 is hardware, the server 105 may be implemented as a distributed server cluster composed of multiple servers, or as a single server; and when the server 105 is software, the server 105 may be implemented as multiple software pieces or software modules, or as a single software piece or software module, which is not specifically limited herein.

The server 105 may provide various services through various built-in applications. Taking a traffic navigation application that may provide a traffic state at an interaction as an example, the following effects can be realized when the server 105 runs the traffic navigation application: a target intersection where the user wishes to acquire a traffic state thereof is first determined via the terminal device 101, 102, or 103 through the network 104; monitoring data is then acquired from at least one camera in a camera group provided at the target intersection, where the at least one camera is capable of shooting object moving states at different road sections or a same road section at the target intersection; after the monitoring data is acquired, a moving trajectory of a reference object recorded by each camera is determined based on monitoring data acquired from the at least one camera; moving trajectories of the same reference object are fused to obtain a completed trajectory; and finally, an indication state of a signal light on a corresponding road is predicted based on a travel direction of the corresponding road, the completed trajectory being located on the corresponding road.

It should be noted that the monition data for a target intersection may be acquired in real time from the at least one camera provided at the target intersection through the network 104, or may be alternatively pre-stored locally at the server 105 in various ways based on actual requirements. Therefore, when the server 105 detects that the monitoring data is stored locally (such as road planning information and real-time traffic state information generated based on existing navigation information in a particular area), the server may choose to locally acquire the data directly. In this case, the example system architecture 100 may alternatively not include the terminal device 101, 102, 103 and the network 104.

Since determining the moving trajectory of the reference object based on the monitoring data requires lots of computing resources and strong computing capabilities, and the method for acquiring a traffic state provided in subsequent embodiments of the present disclosure is generally executed by the server 105 which is provided with lots of computing resources and a strong computing capability, and correspondingly, the apparatus for acquiring a traffic state is also generally provided in the server 105. However, it should be noted that, when the terminal device 101, 102, and/or 103 alternatively have the computing resources and the computing capabilities that meet the requirements, the terminal device 101, 102, and/or 103 may completed the computing, which is generally performed by the server 105, through a corresponding application installed on the terminal device 101, 102, and/or 103, thereby outputting the same result as that of the server 105. Particularly, in the case where there are multiple terminal devices with different computing capabilities, when the corresponding application determines that the terminal devices on which the corresponding application is installed have strong computing capabilities and lots of computing resources, the corresponding application may hand the computing to the terminal device, thereby reducing the operation amount of the server 105, and correspondingly, in this situation the apparatus for acquiring a traffic state may also generally provided in the terminal device 101, 102, or 103. In this case, the example system architecture 100 may alternatively not include the server 105 and the network 104.

It should be appreciated that the number of the terminal devices, the network and the server in FIG. 1 is merely illustrative. Any number of terminal devices, networks and servers may be provided based on actual requirements.

Figure 2:
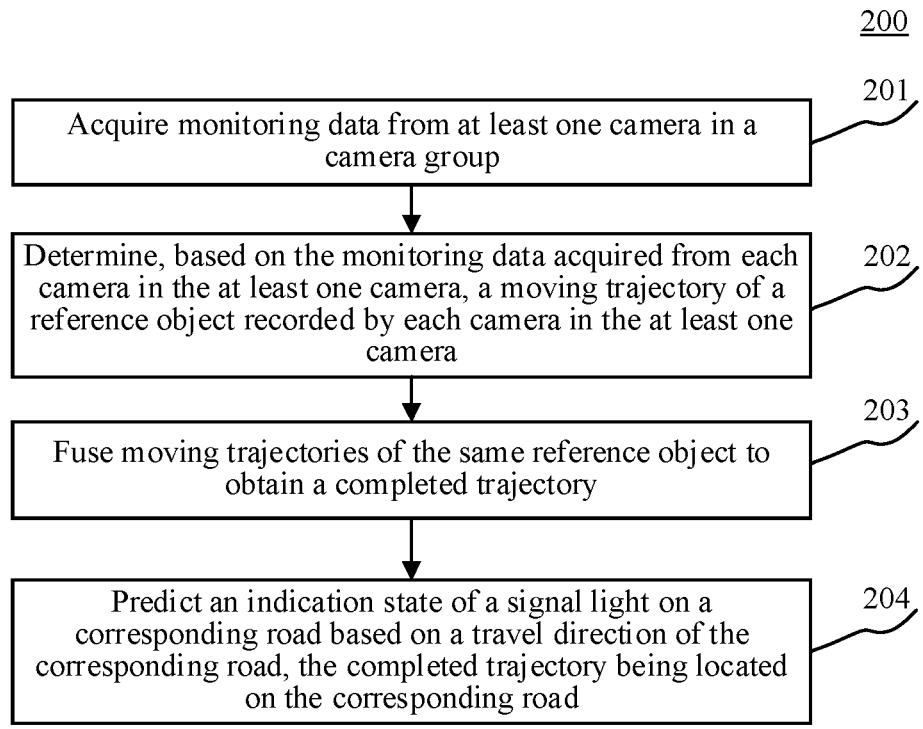
FIG. 2 is a flowchart of a method for acquiring a traffic state according to embodiments of the present disclosure.

Referring to FIG. 2, FIG. 2 is a flowchart of a method for acquiring a traffic state according to embodiments of the present disclosure, and the flow 200 includes steps 201 to 204.

Step 201, acquiring monitoring data from at least one camera in a camera group.

In this embodiment, after determining a target intersection whose traffic state is expected to be acquired, an execution body (such as the server 105 shown in FIG. 1) of the method for acquiring a traffic state may acquire the monitoring data from at least one camera in a camera group, the camera group is composed of cameras directing to the target intersection or capable of monitoring the target intersection.

In an implementation of the present embodiment, a camera collects images about the target intersection at intervals of a predetermined time period, thereby obtains a plurality of consecutive image frames, the plurality of image frames form a video stream. The above-mentioned monitoring data includes the plurality of image frames about the target interaction collected by the camera and the time point when the camera collects each of the image frames.

It should be appreciated that since the camera group is composed of cameras directing to the target intersection or capable of monitoring the target intersection, the camera in the camera group is capable of shooting object moving states of different road sections or the same road section at the target intersection.

It should be noted that based on different actual use requirements, for example, for predicting an indication state of a signal light in an image which is shot by a camera at a particular time, historical monitoring data collected by the camera may be acquired from a local storage device provided in the execution body, or monitoring data may be directly acquired from a non-local storage device or a camera connected to the execution body. The local storage device may be a data storage module provided in the execution body, such as a server hard disk, and in this case, the monitoring data can be read quickly locally; and the non-local storage device may alternatively be any other electronic device configured to store data, such as a user terminal, and in this case, the execution body may acquire the required monitoring data by transmitting an acquisition command to the electronic device.

Step 202, determining, based on the monitoring data acquired from each camera in the at least one camera, a moving trajectory of a reference object recorded by each camera in the at least one camera.

In this embodiment, on the basis of the step 201, the acquired monitoring data is analyzed, and after a reference object appearing in the acquired monitoring data of the at least one camera is determined, the execution body determines the moving trajectories of the reference object in the acquired monitoring data of the cameras based on contents of the monitoring data, i.e., determines the moving trajectory of the reference object recorded by each camera.

The reference object is usually an object, such as a motor vehicle, a non-motor vehicle or a pedestrian, that moves according to an indication of a signal light to pass through an intersection, and the reference object moves according to the indication state of the signal light installed at the target intersection.

In some alternative implementations of the present embodiment, after a position of the reference object corresponding to each image frame in a video stream of the monitoring data is determined, the determined positions of the reference object may be connected to form a completed moving trajectory. As an example, the execution body may first obtain the shooting parameter corresponding to each camera, including the camera's internal parameters such as the focal length and pixel size of the camera, and/or the camera's external parameters such as the position of the camera and rotation direction of the camera in the world coordinate system. Then the execution body may determine the pixel coordinates of the reference object in each image frame acquired by each camera, and convert the pixel coordinates of the reference object in the monitoring data to the world coordinates in the world coordinate system based on the external and/or internal parameter of each camera. The reference object has pixel coordinates in each image frame including the reference object captured by the camera. When the pixel coordinates of the reference object in an image frame are converted to the world coordinates in the world coordinate system, the world coordinates forms a trajectory point in the world coordinate system corresponding to the reference object. Alternatively, one image frame containing the image of the reference object corresponds to one trajectory point, and a trajectory point represents the position/world coordinates of the reference object in the world coordinate system. The monitoring data/video stream collected by a camera forms a series of trajectory points, and the series of trajectory points are connected to form the moving trajectory of the reference object recorded by the camera.

Step 203, fusing moving trajectories of the same reference object to obtain a completed trajectory.

In this embodiment, after the moving trajectories of the reference object corresponding to the monitoring data of the cameras generated in the above step 202 are acquired, the moving trajectories are fused to obtain a completed trajectory that is capable of reflecting a completed moving of the reference object at the target intersection.

After the moving trajectories of the reference object corresponding to the monitoring data of the cameras are unified to the identical coordinate system (for example, the world coordinate system), the complete moving behavior of the reference object at the interaction may be determined based on moving behaviors and position change information of the reference object provided by the monitoring data of the cameras, so as to obtain the completed trajectory, or the moving trajectories generated based on the monitoring data of the cameras may be directly spliced to obtain the completed trajectory.

Step 204, predicting an indication state of a signal light on a corresponding road based on a travel direction of the corresponding road, the completed trajectory being located on the corresponding road.

In this embodiment, the travel road (i.e., the road(s) on which the completed trajectory is located) of the reference object is determined based on the obtained completed trajectory, and the indication state of the signal light provided at road is predicted based on the travel direction of the road on which the completed trajectory is located.

During generating the completed trajectory, the moving state/behavior of the reference object may be determined based on the continuity of the formation of the completed trajectory and a speed change of the reference object in the completed trajectory. For example, during generating the completed trajectory of the reference object, a speed change corresponding to a trajectory point is great, that is, the moving state/behavior of the reference object may be determined as changing from a static state to a moving state, and then it is correspondingly determined that at the time point corresponding to the trajectory point where the speed change of the reference object is obvious, the indication state of the signal light changes from pass-forbade state to a pass-allowed state. As an example, the distance between a pair of adjacent trajectory points may be determined based on the positions of adjacent trajectory points in the world coordinate system, and the speed of the reference object at the adjacent trajectory points may be determined based on the determined distance and the predetermined time period. It should be understood that, since image fames are collected by the camera at intervals of the predetermined time period, the time length corresponding to each pair of adjacent trajectory points is identical (i.e., equal to the predetermined time period), so that adjacent trajectory points separated by a greater distance represents that the speed of the reference object is greater within the time length between the time points corresponding to the adjacent trajectory points.

Furthermore, in this embodiment, a detailed content indicated by the signal light, such as a straight pass-allowed state or a turn-left pass-allowed state, may be further predicted based on the travel direction of the road on which the completed trajectory is located, so that determination of indication information (such as a straight lane, or a left-turn lane) of the road on which the completed trajectory is located and determination of a display shape (the signal light being an arrow-shaped indication light) corresponding to the signal light may be achieved based on the completed trajectory, thereby better verifying if a content of a to-be-inspected image including the signal light is correct.

The method for acquiring a traffic state according to embodiments of the present disclosure, determines the moving state of an object which subject to the indication of the signal light based on the trajectory information of the object, and predicts the traffic state of the signal light based on the determined moving state of the object, so that the method can not only acquire the state information of the signal light directly through the monitoring data acquired from the cameras through a non-model recognition method, but also provide reliable verification information to verify the display result of the signal light recognized by a detection algorithm or model in the conventional technology.

In some alternative implementations of this embodiment, in order to facilitate fusion of the moving trajectories of the reference object recorded by a plurality of cameras, so as to improve efficiency of acquiring the moving trajectories of the reference object, the execution body may correspondingly acquire external and internal parameters of the cameras after acquiring the monitoring data of the cameras, and may convert pixel coordinates of the reference object in the monitoring data to world coordinates in the world coordinate system based on the external and internal parameters of the cameras, so as to provide a unified standard for the reference object recorded in all monitoring data, thereby achieving the purpose of fusing the trajectories of the reference object recorded in the monitoring data of all cameras.

The pixel coordinates of the reference object in all monitoring data of cameras are determined based on the hardware parameters of the cameras, and after the pixel coordinates are correspondingly integrated into an identical coordinate system, the positions and moving states of the reference object are restored directly based on the coordinates with the given standard, which may improve the efficiency and quality of the obtained motion trajectories.

In some alternative embodiments of the present disclosure, the predicting the indication state of the signal light on the corresponding road based on the travel direction of the corresponding road, the completed trajectory being located on the corresponding road, includes: acquiring, in response to there being a target trajectory point whose speed increase change amount exceeds a preset threshold in the completed trajectory, a time point at which the target trajectory point is determined; and determining the indication state of the signal light on the corresponding road in the travel direction of the corresponding road, the completed trajectory being located on the corresponding road, as a pass-allowed state after the determined time point.

Particularly, after the completed trajectory is obtained, trajectory points of the reference object on the completed trajectory are acquired, and in response to there being a trajectory point at which the reference object has a speed increase change amount exceeding the preset threshold in the completed trajectory, the trajectory point is determined as the target trajectory point, and the time point corresponding to the target trajectory point is acquired, and the indication state of the signal light on the corresponding road in the travel direction of the corresponding road on which the completed trajectory is located is determined as the pass-allowed state after the determined time point. It is determined whether the reference object is in a moving state that changes from a low speed (adjacent positions/adjacent trajectory points in the completed trajectory are separated by a small distance) or a static state (adjacent positions/adjacent trajectory points in the completed trajectory coincide with each other or are separated by a minor distance) to a normal moving state by determining a moving trend change, i.e., a speed increase change, and the time point at which the indication state of the signal light changes from an pass-forbade state to a pass-allowed state is acquired, so as to determine the indication state of the signal light, and a change of the indication state of the signal light is predicted based on the trajectory information of the reference object, so as to acquire more information of a traffic state and improve a reference value of the acquired traffic state.

By setting a preset threshold for the speed increase change amount, and the preset threshold may be set according to the type of the reference object, so that the moving state of the reference object is more accurately acquired.

In some alternative embodiments of the present disclosure, the predicting the indication state of the signal light on the corresponding road based on the travel direction of the corresponding road on which the completed trajectory is located, includes: in response to there being a plurality of stationary points at the same position in the completed trajectory, determining the indication state of the signal light on the corresponding road in the travel direction of the corresponding road on which the completed trajectory is located as an pass-forbade state within a time length corresponding to the plurality of stationary points.

Particularly, after the completed trajectory is obtained, the trajectory points of the reference object on the completed trajectory are acquired, and in response to determining that the reference object has a plurality of trajectory points at the same position in the completed trajectory, the trajectory points at the same position are determined as the stationary trajectory points, and the time points when the reference object is at the stationary trajectory points are correspondingly determined, and finally the indication state of the signal light on the corresponding road in the travel direction of the corresponding road on which the completed trajectory is located is determined as the pass-forbade state within the time length covering the time points corresponding to the stationary points. It is determined whether the reference object is in a static state by determining whether the reference object is at same position during a time length covering different time points, so as to determine the indication state of the signal light without actually acquiring the moving speed of the reference object, thereby reducing the operation amount of determining the indication state of the signal light.

Figure 3:
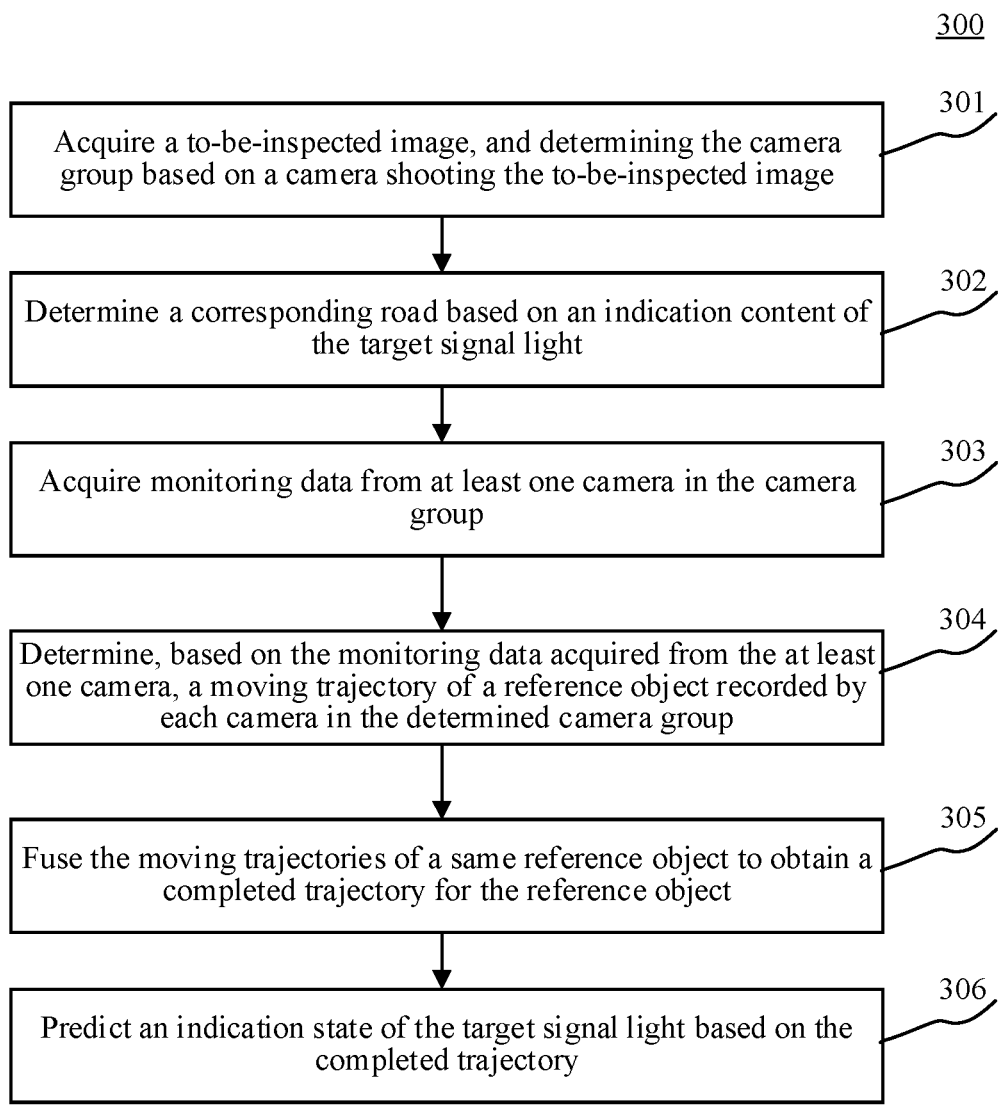
FIG. 3 is another flowchart of the method for acquiring a traffic state according to embodiments of the present disclosure.

Referring to FIG. 3, FIG. 3 is another flowchart of the method for acquiring a traffic state according to an embodiment of the present disclosure, and the flow 300 includes steps 301 to 306.

Step 301, acquiring a to-be-inspected image, and determining the camera group based on a camera shooting the to-be-inspected image.

In this embodiment, an execution body (such as the server 105 shown in FIG. 1) of the method for acquiring a traffic state may acquire the to-be-inspected image including a signal light from a user terminal, or may acquire the to-be-inspected image from a local or non-local storage device of the execution body based on actual requirements. After the to-be-inspected image is acquired, the corresponding camera group may be determined based on the camera shooting the to-be-inspected image, and the signal light in the to-be-inspected image is determined as a target signal light.

Step 302, determining a corresponding road based on an indication content of the target signal light.

In this embodiment, based on the target signal light determined in the step 301, the road indicated by the target signal light is determined as the indicated road.

Step 303, acquiring monitoring data from at least one camera in the camera group.

Step 304, determining, based on the monitoring data acquired from the at least one camera, a moving trajectory of a reference object recorded by each camera in the determined camera group.

In this embodiment, the reference object appearing on the indicated road in the monitoring data of cameras is determined from the monitoring data of the camera, and the moving trajectories of the reference object respectively recorded in the cameras are determined.

Step 305, fusing the moving trajectories of a same reference object to obtain a completed trajectory for the reference object.

Step 306, predicting an indication state of the target signal light based on the completed trajectory.

The steps 303 to 306 correspond to the steps 201 to 204 shown in FIG. 2. The contents of the steps 303 to 306 may be referred to the corresponding contents of the steps 201 to 204, and are not described in detail herein.

On the basis of the technical solution provided by the previous embodiment, this embodiment may further predict the display state of the target signal light included in a to-be-inspected image, so as to provide a technical solution for prediction based on actual requirements. The technical solution may acquire a traffic state based on user requirements, thereby reducing the operation amount of processing data and improving user experience.

Further, on the basis of any previous embodiment, in order to avoid acquiring an incorrect indication state result of the signal light due to abnormal behavior of the reference object, the predicting the indication state of the signal light on the corresponding road based on the travel direction of the corresponding road on which the completed trajectory is located, includes: acquiring indication states of the signal light corresponding to a plurality of different reference objects on the same road; and determining an indication state of the signal light, the determined indication state accounting for a highest proportion in the acquired indication states, as the indication state of the signal light on the corresponding road.

Particularly, after acquiring the indication states of the signal light corresponding to the different reference objects, the reference objects which are on the same road within a preset time period are determined, and then the indication states of the signal light corresponding to the determined reference objects are acquired. When a proportion of the number of reference objects corresponding to an identical indication state of the signal light at the same time period exceeds a preset threshold, the identical indication state of the signal light is determined as the indication state of the signal light on the corresponding road, thereby avoiding acquiring the incorrect indication state of the signal light due to abnormal behavior of a few or individual reference objects and improving the quality and accuracy of the obtained indication state of the signal light.

Figures 1, 4:
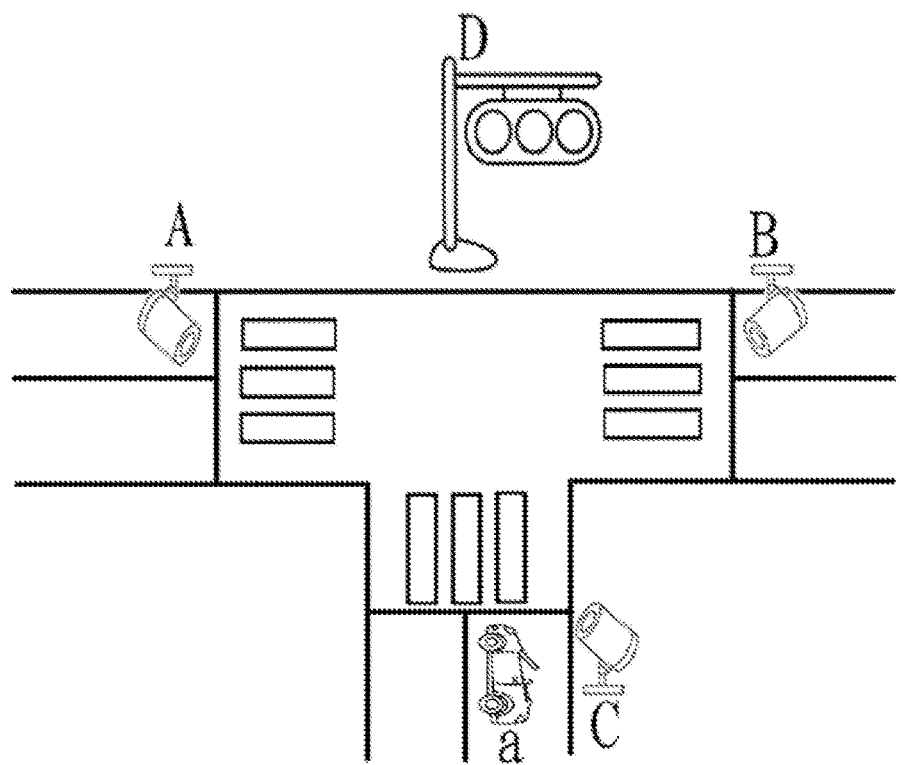
Figures 2, 4:
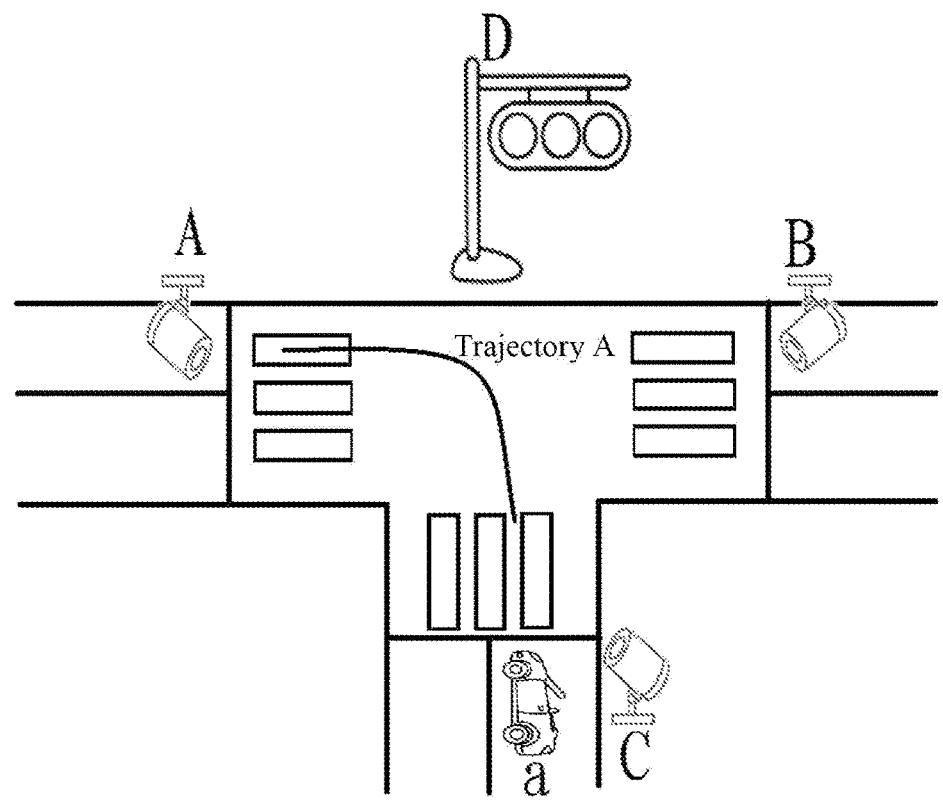
Figures 3, 4:
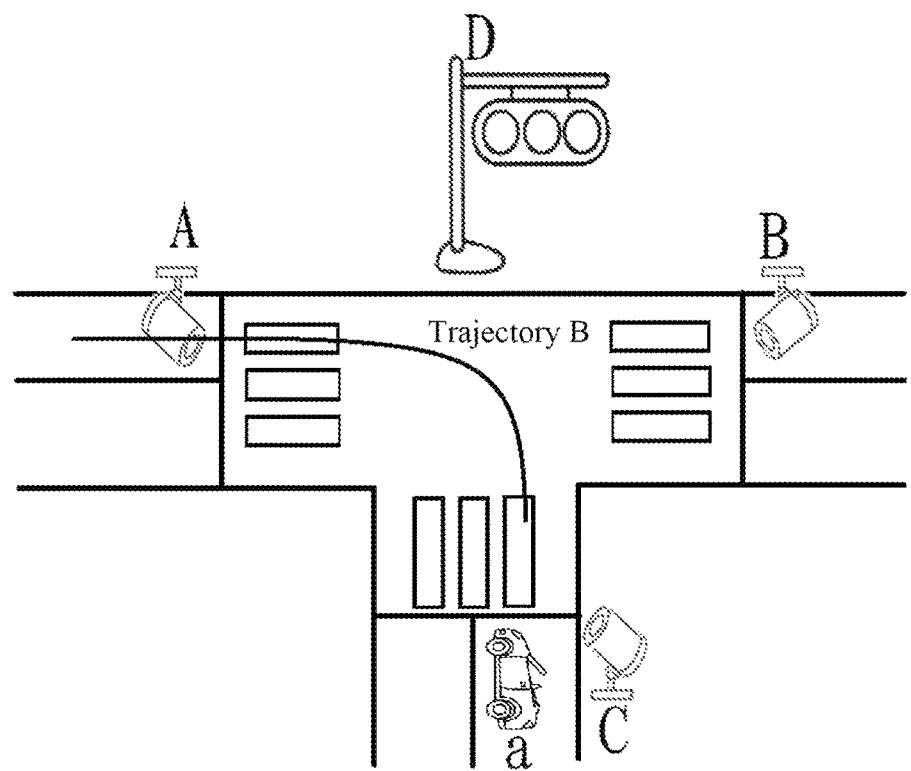
Figure 4:
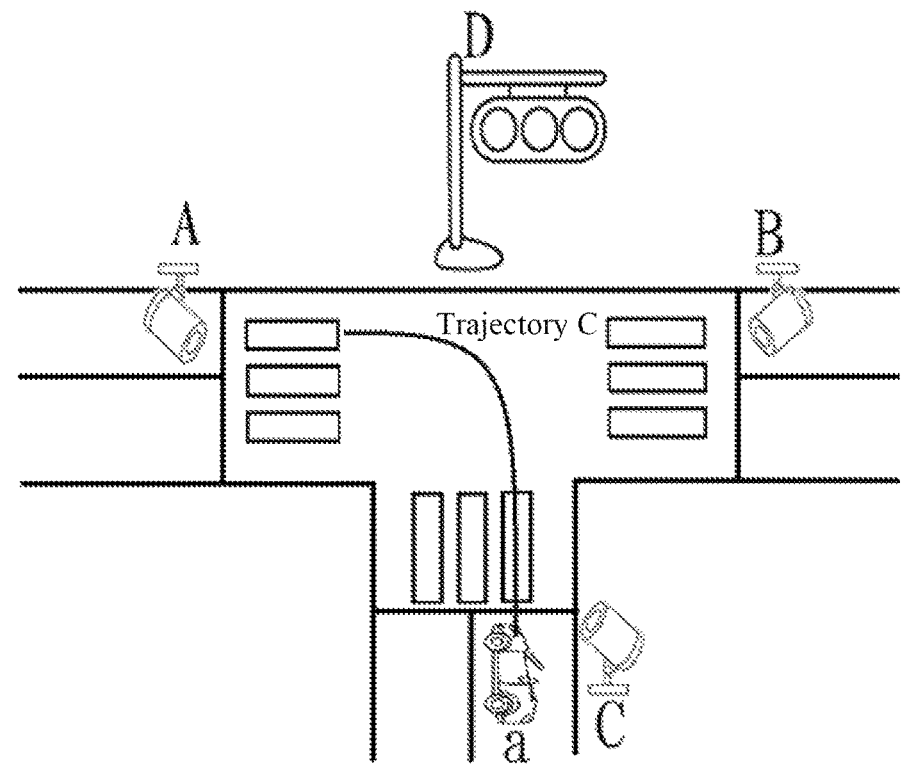

For a better understanding of the embodiments of the present disclosure, a specific implementation of the present disclosure provides a specific application scenario. As shown in FIG. 4-1, cameras A, B and C are provided at a T-shaped target intersection, and an indication state of a signal light D on a corresponding road is determined based on a completed trajectory of a reference object a. The implementation solution is detailed as follows:

monitoring data is acquired from each camera in the camera group composed of the cameras A, B and C.

determining a moving trajectory of the reference object recorded by each camera based on the monitoring data acquired from each camera. A trajectory recorded by the camera A is a trajectory A shown in FIG. 4-2, and a trajectory recorded by the camera B is a trajectory B shown in FIG. 4-3, and a trajectory recorded by the camera C is a trajectory C shown in FIG. 4-4.

Figures 4, 5:
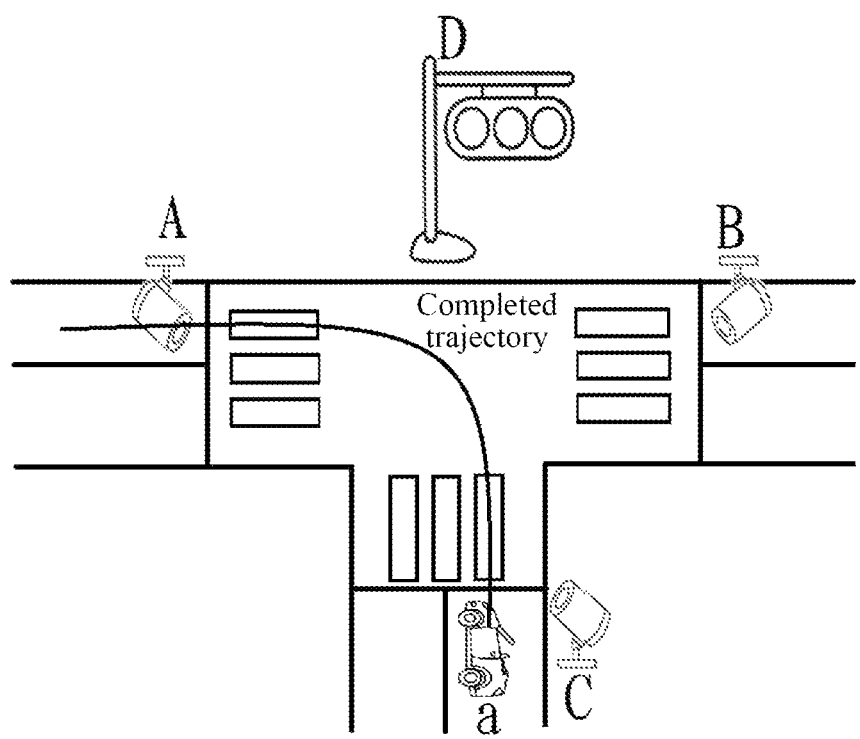
Figure 5:
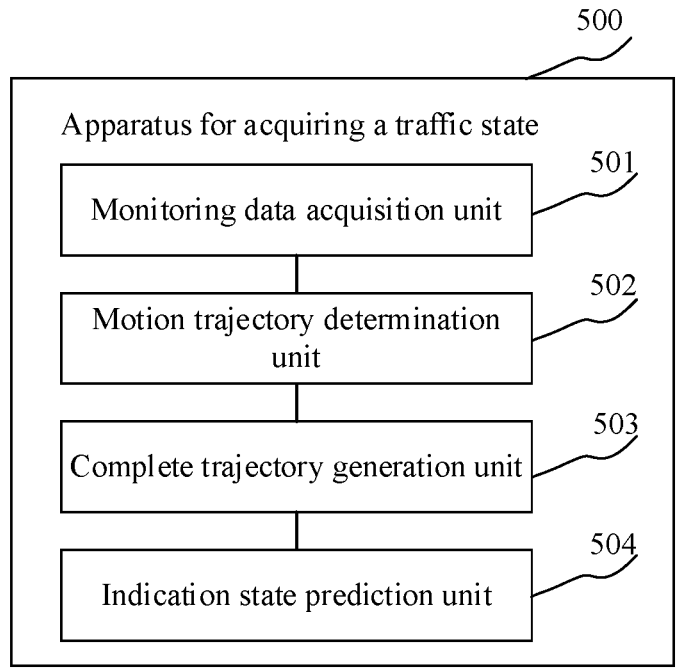

The moving trajectories of the reference object a are fused to obtain a completed trajectory shown in FIG. 4-5, and a speed of the reference object a is determined when the completed trajectory of the reference object is formed.

In response to determining that the speed of the reference object a is a constant speed when the completed trajectory of the reference object is formed, the speed having a value of 30 km/h, which is faster than a preset threshold of 5 km/h, an indication state of the corresponding signal light D is predicted as a pass-allowed state.

According to the embodiment of the present disclosure, the moving state of an object is determined based on the trajectory information of the object, the object being subject to the indication of the signal light, and the traffic state of the signal light is predicted based on the determined moving state of the object, so that embodiments of the the present disclosure can not only acquire the state information of the signal light directly through the monitoring data acquired from the cameras by using a non-model recognition method, but also provide reliable verification information to verify the display result of the signal light recognized by a detection algorithm or model in the conventional technology.

Further referring to FIG. 5, as an implementation of the method shown in each of the above figures, the present disclosure provides an embodiment of an apparatus for acquiring a traffic state. The embodiment of the apparatus corresponds to the embodiment of the method shown in FIG. 2, and the apparatus is particularly applicable to various electronic devices.

As shown in FIG. 5, the apparatus 500 for acquiring a traffic state of this embodiment may include: a monitoring data acquisition unit 501, a moving trajectory determination unit 502, a completed trajectory generation unit 503 and an indication state prediction unit 504. The monitoring data acquisition unit 501 is configured to acquire monitoring data from at least one camera in a camera group, wherein the at least one camera is capable of shooting object moving states at different road sections or a same road section of a target intersection; the moving trajectory determination unit 502 is configured to determine, based on the monitoring data acquired from each camera in the at least one camera, a moving trajectory of a reference object recorded by the each camera in the at least one camera; the completed trajectory generation unit 503 is configured to fuse moving trajectories of the reference object to obtain a completed trajectory; and the indication state prediction unit 504 is configured to predict an indication state of a signal light on a corresponding road based on a travel direction of the corresponding road, the completed trajectory being located on the corresponding road.

In this embodiment, the processing of the monitoring data acquisition unit 501, the moving trajectory determination unit 502, the completed trajectory generation unit 503 and the indication state prediction unit 504 of the apparatus 500 for acquiring a traffic state and the technical effects thereof may be described with reference to the related description of steps 201 to 204 in the embodiment corresponding to FIG. 2, and are not described in detail herein.

In some alternative implementations of this embodiment, the moving trajectory determination unit 502 includes: a hardware parameter acquisition subunit configured to acquire a shooting parameter corresponding to the each camera; a pixel coordinate generation subunit configured to determine pixel coordinates of the reference object in the monitoring data corresponding to the each camera; a word coordinate conversion subunit configured to convert the determined pixel coordinates to world coordinates; and a moving trajectory determination subunit configured to determine the moving trajectory of the reference object recorded by the each camera based on the world coordinates.

In some alternative implementations of this embodiment, the indication state prediction unit 504 includes: a starting point determination subunit configured to: in response to there being a target point in the completed trajectory, speed increase change amount at the target point exceeding a preset threshold, acquiring a time point at which the target point is generated; and a first indication state prediction subunit configured to determine the indication state of the signal light on the corresponding road in the travel direction of the corresponding road, the completed trajectory being located on the corresponding road, as a pass-allowed state after the time point.

In some alternative implementations of this embodiment, the indication state prediction unit 504 includes: a stationary point determination subunit configured to: in response to there being a plurality of stationary points at a same position in the completed trajectory, determining the indication state of the signal light on the corresponding road in the travel direction of the corresponding road, the completed trajectory being located on the corresponding road, as a pass-forbade state within a time length corresponding to the plurality of stationary points.

In some alternative implementations of this embodiment, the indication state prediction unit 504 includes: an indication state collection subunit configured to acquire indication states of the signal light corresponding to a plurality of different reference objects on the same road; and a third indication state prediction subunit configured to determine an indication state of the signal light, the determined indication state accounting for a highest proportion in the acquired indication states, as the indication state of the signal light on the corresponding road.

In some alternative implementations of this embodiment, the apparatus 500 for acquiring a traffic state further includes: a to-be-inspected image acquisition unit configured to acquire a to-be-inspected image, and determine the camera group based on a camera shooting the to-be-inspected image, wherein the to-be-inspected image comprises a target signal light; and an indicated road determination unit configured to determine a corresponding indicated road based on an indicated content of the target signal light. The moving trajectory determination unit is further configured to determine, based on the monitoring data acquired from the at least one camera, the moving trajectory of the reference object recorded by the each camera, the reference object being located on the corresponding indicated road; and the indication state prediction unit is further configured to predict the indication state of the target signal light based on the completed trajectory.

This embodiment exists as the embodiment of the apparatus corresponding to the embodiment of the method. The apparatus for acquiring a traffic state according to embodiments of the present disclosure determines the moving state of the indicated object based on the trajectory information of the object which is subjected to the indication of the signal light, and predicts the traffic state of the signal light based on the determined moving state of the indicated object, so that the apparatus can not only acquire the state information of the signal light directly through the monitoring data acquired from the cameras by using a non-model recognition method, but also provide reliable verification information to verify the display result of the signal light recognized by a detection algorithm or model in the conventional technology.

According to embodiments of the present disclosure, the present disclosure further provides an electronic device, a readable storage medium and a computer program product.

Figure 6:
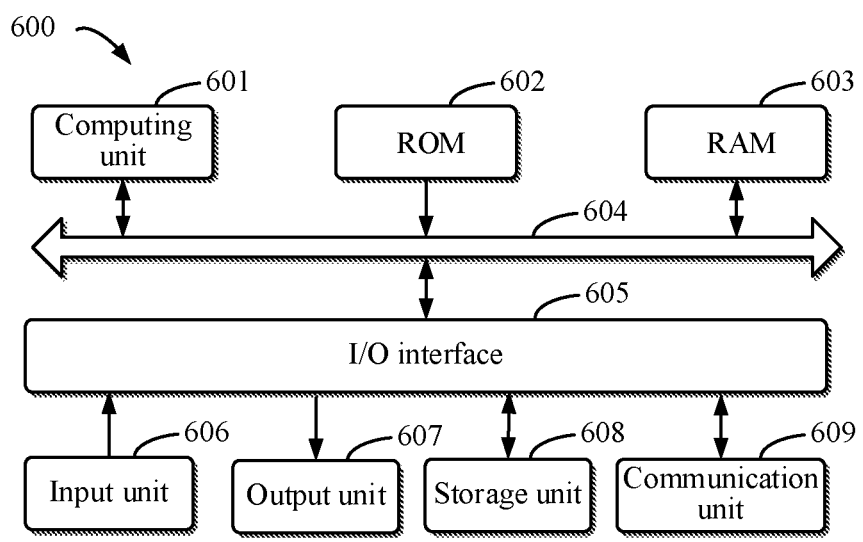
FIG. 6 is a schematic structural diagram of an electronic device adapted to execute the method for acquiring a traffic state according to embodiments of the present disclosure.

FIG. 6 shows a schematic block diagram of an electronic device 600 adapted to implement embodiments of the present disclosure. The electronic device is intended to represent various forms of digital computers, such as laptops, desktops, worktables, personal digital assistants, servers, blade servers, mainframe computers and other suitable computers. The electronic device may alternatively represent various forms of mobile devices, such as personal digital processing, cellular phones, smart phones, wearable devices and other similar computing devices. The components, their connections and relationships, and their functions shown herein are examples only, and are not intended to limit the implementations of the present disclosure as described and/or claimed herein.

As shown in FIG. 6, the device 600 may include a computing unit 601, which may execute various appropriate actions and processes in accordance with a computer program stored in a read-only memory (ROM) 602 or a computer program loaded into a random-access memory (RAM) 603 from a storage unit 608. The RAM 603 may alternatively store various programs and data required by operations of the device 600. The computing unit 601, the ROM 602 and the RAM 603 are connected to each other through a bus 604. An input/output (I/O) interface 605 is also connected to the bus 604.

Multiple components of the device 600 are connected to the I/O interface 605, and include: an input unit 606, such as a keyboard and a mouse; an output unit 607, such as various types of displays and a speaker; a storage unit 608, such as a magnetic disk and an optical disk; and a communication unit 609, such as a network card, a modem and a wireless communication transceiver. The communication unit 609 allows the device 600 to exchange information or data with other devices through a computer network, such as the Internet and/or various telecommunications networks.

The computing unit 601 may be various general-purpose and/or specific-purpose processing components having processing and computing capabilities. Some examples of the computing unit 601 include, but are not limited to, a central processing unit (CPU), a graphics processing unit (GPU), various specific artificial intelligence (AI) computing chips, various computing units running machine learning model algorithms, a digital signal processor (DSP), and any appropriate processor, controller, microcontroller and the like. The computing unit 601 performs various methods and processing described above, such as the method for acquiring a traffic state. For example, in some embodiments, the method for acquiring a traffic state may be implemented as a computer software program, which is tangibly included in a machine-readable medium, such as the storage unit 608. In some embodiments, part or all of the computer program may be loaded and/or installed on the device 600 through the ROM 602 and/or the communication unit 609. When the computer program is loaded into the RAM 603 and executed by the computing unit 601, one or more steps of the method for acquiring a traffic state described above may be performed. Alternatively, in other embodiments, the computing unit 601 may be configured to perform the method for acquiring a traffic state in any other appropriate manner (such as through firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host, which is a host product in a cloud computing service system and may solve the defects of difficult management and weak service scalability existing in a conventional physical host and a VPS (Virtual Private Server) service. The server may alternatively be a server of a distributed system, or a server combined with a blockchain.

In addition to the electronic device, a roadside device may include a communication component and the like. The electronic device may be integrated with the communication component, or the electronic device and the communication component may be provided separately. The electronic device may acquire data (such as a picture and a video) from a sensing device (such as a roadside camera, alternatively called as a roadside webcam), to perform image and video processing and data calculation. Alternatively, the electronic device itself, such as an AI camera, may alternatively have a sensing data acquisition function and a communication function, and the electronic device may directly perform image and video processing and data calculation based on acquired sensing data.

A cloud control platform performs processing in the cloud. The electronic device included in the cloud control platform may acquire data (such as a picture and a video) from a sensing device (such as a roadside camera), to perform image and video processing and data calculation; and the cloud control platform may alternatively be called as a vehicle-road collaborative management platform, an edge computing platform, a cloud computing platform, a central system, a cloud server and the like.

The technical solutions provided in embodiments of the present disclosure determine the moving state of an object based on the trajectory information of the object, the object being subjected to the indication of the signal light, and predict the traffic state of the signal light based on the determined moving state of the object, so that the technical solutions can not only acquire the state information of the signal light directly through the monitoring data acquired from the cameras by using a non-model recognition method, but also provide reliable verification information to verify the display result of the signal light recognized by a detection algorithm or model in the conventional technology.

It should be appreciated that the steps of reordering, adding or deleting may be executed using the various forms shown above. For example, the steps described in the present disclosure may be executed in parallel or sequentially or in a different order, so long as the expected results of the technical schemas provided in the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for acquiring a traffic state, the method comprising:
   acquiring monitoring data from at least one camera in a camera group, wherein the at least one camera is capable of shooting object moving states at different road sections or a same road section of a target intersection;
   determining, based on the monitoring data acquired from each camera in the at least one camera, a moving trajectory of a reference object recorded by the each camera in the at least one camera;
   fusing moving trajectories of the reference object to obtain a completed trajectory; and
   predicting an indication state of a signal light on a corresponding road based on a travel direction of the corresponding road, the completed trajectory being located on the corresponding road.

2. The method according to claim 1, wherein the determining, based on the monitoring data acquired from the at least one camera, a moving trajectory of a reference object recorded by the each camera, comprises:
   acquiring a shooting parameter corresponding to the each camera;
   determining pixel coordinates of the reference object in the monitoring data corresponding to the each camera;
   converting the determined pixel coordinates to world coordinates; and
   determining the moving trajectory of the reference object recorded by the each camera based on the world coordinates.

3. The method according to claim 1, wherein the predicting an indication state of a signal light on a corresponding road based on a travel direction of the corresponding road, the completed trajectory being located on the corresponding road, comprises:
   in response to there being a target point in the completed trajectory, speed increase change amount at the target point exceeding a preset threshold, acquiring a time point at which the target point is generated; and
   determining the indication state of the signal light on the corresponding road in the travel direction of the corresponding road, the completed trajectory being located on the corresponding road, as a pass-allowed state after the time point.

4. The method according to claim 1, wherein the predicting an indication state of a signal light on a corresponding road based on a travel direction of the corresponding road, the completed trajectory being located on the corresponding road, comprises:
   in response to there being a plurality of stationary points at a same position in the completed trajectory, determining the indication state of the signal light on the corresponding road in the travel direction of the corresponding road, the completed trajectory being located on the corresponding road, as a pass-forbade state within a time length corresponding to the plurality of stationary points.

5. The method according to claim 1, wherein the predicting an indication state of a signal light on a corresponding road based on a travel direction of the corresponding road, the completed trajectory being located on the corresponding road, comprises:
   acquiring indication states of the signal light corresponding to a plurality of different reference objects on the same road; and
   determining an indication state of the signal light, the determined indication state accounting for a highest proportion in the acquired indication states, as the indication state of the signal light on the corresponding road.

6. The method according to claim 1, the method further comprising:
   acquiring a to-be-inspected image, and determining the camera group based on a camera shooting the to-be-inspected image, wherein the to-be-inspected image comprises a target signal light;
   determining a corresponding indicated road based on an indication content of the target signal light; and
   the determining, based on the monitoring data acquired from the at least one camera, a moving trajectory of a reference object recorded by the each camera in the determined camera group, comprising:
   determining, based on the monitoring data acquired from the at least one camera, the moving trajectory of the reference object recorded by the each camera, the reference object being located on the corresponding indicated road; and the predicting an indication state of a signal light on a corresponding road based on a travel direction of the corresponding road, the completed trajectory being located on the corresponding road, comprising:

predicting the indication state of the target signal light based on the completed trajectory.

7. An electronic device, comprising:

at least one processor; and a memory storing instructions, the instructions when executed by the at least one processor, cause the at least one processor to perform operations, the operations comprising:

acquiring monitoring data from at least one camera in a camera group, wherein the at least one camera is capable of shooting object moving states at different road sections or a same road section of a target intersection;

determining, based on the monitoring data acquired from each camera in the at least one camera, a moving trajectory of a reference object recorded by the each camera in the at least one camera;

fusing moving trajectories of the reference object to obtain a completed trajectory; and predicting an indication state of a signal light on a corresponding road based on a travel direction of the corresponding road, the completed trajectory being located on the corresponding road.

8. The electronic device according to claim 7, wherein the determining, based on the monitoring data acquired from the at least one camera, a moving trajectory of a reference object recorded by the each camera, comprises:

acquiring a shooting parameter corresponding to the each camera;

determining pixel coordinates of the reference object in the monitoring data corresponding to the each camera;

converting the determined pixel coordinates to world coordinates; and determining the moving trajectory of the reference object recorded by the each camera based on the world coordinates.

9. The electronic device according to claim 7, wherein the predicting an indication state of a signal light on a corresponding road based on a travel direction of the corresponding road, the completed trajectory being located on the corresponding road, comprises:

in response to there being a target point in the completed trajectory, speed increase change amount at the target point exceeding a preset threshold, acquiring a time point at which the target point is generated; and determining the indication state of the signal light on the corresponding road in the travel direction of the corresponding road, the completed trajectory being located on the corresponding road, as a pass-allowed state after the time point.

10. The electronic device according to claim 7, wherein the predicting an indication state of a signal light on a corresponding road based on a travel direction of the corresponding road, the completed trajectory being located on the corresponding road, comprises:

in response to there being a plurality of stationary points at a same position in the completed trajectory, determining the indication state of the signal light on the corresponding road in the travel direction of the corresponding road, the completed trajectory being located on the corresponding road, as a pass-forbade state within a time length corresponding to the plurality of stationary points.

11. The electronic device according to claim 7, wherein the predicting an indication state of a signal light on a corresponding road based on a travel direction of the corresponding road, the completed trajectory being located on the corresponding road, comprises:

acquiring indication states of the signal light corresponding to a plurality of different reference objects on the same road; and determining an indication state of the signal light, the determined indication state accounting for a highest proportion in the acquired indication states, as the indication state of the signal light on the corresponding road.

12. The electronic device according to claim 7, wherein the operations further comprise:

acquiring a to-be-inspected image, and determine the camera group based on a camera shooting the to-be-inspected image, wherein the to-be-inspected image comprises a target signal light; and determining a corresponding indicated road based on an indicated content of the target signal light; and wherein the determining, based on the monitoring data acquired from the at least one camera, a moving trajectory of a reference object recorded by the each camera in the determined camera group, comprises:

determining, based on the monitoring data acquired from the at least one camera, the moving trajectory of the reference object recorded by the each camera, the reference object being located on the corresponding indicated road; and wherein the predicting an indication state of a signal light on a corresponding road based on a travel direction of the corresponding road, the completed trajectory being located on the corresponding road, comprises: predicting the indication state of the target signal light based on the completed trajectory.

13. A non-transitory computer-readable storage medium storing computer instructions, wherein the computer instructions cause a processor to execute operations, the operations comprising:

acquiring monitoring data from at least one camera in a camera group, wherein the at least one camera is capable of shooting object moving states at different road sections or a same road section of a target intersection;

determining, based on the monitoring data acquired from each camera in the at least one camera, a moving trajectory of a reference object recorded by the each camera in the at least one camera;

fusing moving trajectories of the reference object to obtain a completed trajectory; and predicting an indication state of a signal light on a corresponding road based on a travel direction of the corresponding road, the completed trajectory being located on the corresponding road.

14. The medium according to claim 13, wherein the determining, based on the monitoring data acquired from the at least one camera, a moving trajectory of a reference object recorded by the each camera, comprises:

acquiring a shooting parameter corresponding to the each camera;

determining pixel coordinates of the reference object in the monitoring data corresponding to the each camera;

converting the determined pixel coordinates to world coordinates; and determining the moving trajectory of the reference object recorded by the each camera based on the world coordinates.

15. The medium according to claim 13, wherein the predicting an indication state of a signal light on a corresponding road based on a travel direction of the corresponding road, the completed trajectory being located on the corresponding road, comprises:

in response to there being a target point in the completed trajectory, speed increase change amount at the target point exceeding a preset threshold, acquiring a time point at which the target point is generated; and determining the indication state of the signal light on the corresponding road in the travel direction of the corresponding road, the completed trajectory being located on the corresponding road, as a pass-allowed state after the time point.

16. The medium according to claim 13, wherein the predicting an indication state of a signal light on a corresponding road based on a travel direction of the corresponding road, the completed trajectory being located on the corresponding road, comprises:

in response to there being a plurality of stationary points at a same position in the completed trajectory, determining the indication state of the signal light on the corresponding road in the travel direction of the corresponding road, the completed trajectory being located on the corresponding road, as a pass-forbade state within a time length corresponding to the plurality of stationary points.

17. The medium according to claim 13, wherein the predicting an indication state of a signal light on a corresponding road based on a travel direction of the corresponding road, the completed trajectory being located on the corresponding road, comprises:

acquiring indication states of the signal light corresponding to a plurality of different reference objects on the same road; and determining an indication state of the signal light, the determined indication state accounting for a highest proportion in the acquired indication states, as the indication state of the signal light on the corresponding road.

18. The medium according to claim 13, wherein the operations further comprise:

acquiring a to-be-inspected image, and determining the camera group based on a camera shooting the to-be-inspected image, wherein the to-be-inspected image comprises a target signal light;

determining a corresponding indicated road based on an indication content of the target signal light; and the determining, based on the monitoring data acquired from the at least one camera, a moving trajectory of a reference object recorded by the each camera in the determined camera group, comprising:

determining, based on the monitoring data acquired from the at least one camera, the moving trajectory of the reference object recorded by the each camera, the reference object being located on the corresponding indicated road; and the predicting an indication state of a signal light on a corresponding road based on a travel direction of the corresponding road, the completed trajectory being located on the corresponding road, comprising:

predicting the indication state of the target signal light based on the completed trajectory.

19. A roadside device, comprising the electronic device according to claim 7.

20. A cloud control platform, comprising the electronic device according to claim 7.

* * * * *